US009015243B1

(12) United States Patent
Queru

(10) Patent No.: US 9,015,243 B1
(45) Date of Patent: Apr. 21, 2015

(54) AUTOMATED METADATA UPDATES

(75) Inventor: Jean Baptiste Maurice Queru, Foster City, CA (US)

(73) Assignee: Google Inc., Mountain View, CA (US)

( * ) Notice: Subject to any disclaimer, the term of this patent is extended or adjusted under 35 U.S.C. 154(b) by 987 days.

(21) Appl. No.: 13/155,709

(22) Filed: Jun. 8, 2011

Related U.S. Application Data

(60) Provisional application No. 61/424,987, filed on Dec. 20, 2010.

(51) Int. Cl.
  *G06F 15/16* (2006.01)
  *G06F 17/30* (2006.01)

(52) U.S. Cl.
  CPC ................................ *G06F 17/30861* (2013.01)

(58) Field of Classification Search
  CPC . G06F 2212/7207; H04L 67/10; H04L 63/10; H04L 12/1831
  See application file for complete search history.

(56) References Cited

U.S. PATENT DOCUMENTS

| | | | |
|---|---|---|---|
| 7,096,234 B2 | 8/2006 | Plastina et al. | |
| 7,159,000 B2 | 1/2007 | Plastina et al. | |
| 7,262,357 B2 | 8/2007 | Plastina et al. | |
| 7,343,384 B2 | 3/2008 | Plastina et al. | |
| 7,650,563 B2 | 1/2010 | Plastina et al. | |
| 7,725,431 B2 | 5/2010 | Myllyla et al. | |
| 2003/0212826 A1* | 11/2003 | Rapakko et al. | 709/246 |
| 2005/0172786 A1* | 8/2005 | Plastina et al. | 84/600 |
| 2007/0168535 A1 | 7/2007 | Ikonen et al. | |
| 2008/0005184 A1* | 1/2008 | Myllyla et al. | 707/200 |
| 2009/0106454 A1* | 4/2009 | Girle et al. | 709/248 |
| 2009/0259711 A1* | 10/2009 | Drieu et al. | 709/201 |
| 2011/0016120 A1 | 1/2011 | Haughay et al. | |
| 2011/0167455 A1 | 7/2011 | Gao et al. | |

OTHER PUBLICATIONS

Office Action for U.S. Appl. No. 13/249,288 dated Apr. 3, 2012. 15 pages.

* cited by examiner

*Primary Examiner* — Peling Shaw
(74) *Attorney, Agent, or Firm* — McDonnell Boehnen Hulbert & Berghoff LLP

(57) ABSTRACT

Methods, systems, and apparatus, including computer programs encoded on computer storage media, for automatically updating metadata. In one aspect, a method includes determining that metadata associated with an item of electronic content has been updated on a first device, and automatically communicating a notification of the update between the first device and one or more servers. The method also includes selecting a second device that is associated with a user of the first device, automatically communicating the notification between the one or more servers and the selected second device, and automatically updating, by the second device, metadata that is stored on the second device and that is associated with the item of electronic content, based on the notification.

18 Claims, 4 Drawing Sheets

AUTOMATED METADATA UPDATES

CROSS-REFERENCE TO RELATED APPLICATION

This application claims the benefit of U.S. Pat. App. No. 61/424,987, filed Dec. 20, 2010, which is incorporated herein by reference.

BACKGROUND

Electronic content often includes attributes that are stored as metadata in association with the electronic content. For instance, an audio file may include metadata that identifies a name of a song, an artist name, a track number, an album name, ratings, a genre, when the song was purchased, a number of times that the song has been played or skipped, or a playlist in which a song is included. When the same song is stored on multiple devices, the metadata may be synchronized when a user physically connects the devices and initiates a metadata synchronization operation.

SUMMARY

According to one general implementation, when metadata is updated at one device, other devices are automatically informed of the update and may update their own metadata accordingly. By allowing devices to communicate with each other about metadata updates, synchronization of metadata for electronic content may be performed without requiring a user to physically connect their device to other devices, or to manually initiate a metadata synchronization operation.

According to another aspect, the subject matter described in this disclosure may be embodied in methods that include the actions of determining that metadata associated with an item of electronic content has been updated at a first device and automatically communicating a notification of the update between the first device and one or more servers. The actions also include selecting a second device that is associated with a user of the first device, automatically communicating the notification between the one or more servers and the selected second device, and automatically updating, by the second device, metadata that is stored on the second device and that is associated with the item of electronic content, based on the notification.

According to another aspect, the subject matter described in this disclosure may be embodied in methods that include the actions of determining that a user has updated metadata associated with an item of electronic content, and automatically forwarding a notification of the update to one or more servers.

According to another aspect, the subject matter described in this disclosure may be embodied in methods that include the actions of receiving, from a mobile device, a notification that a user has updated metadata associated with an item of electronic content, selecting other devices that are associated with the user, and automatically transmitting the notification to one or more of the other devices.

According to another aspect, the subject matter described in this disclosure may be embodied in methods that include the actions of receiving, from one or more servers, a notification that, using a different device, a user associated with the device has updated metadata associated with an item of electronic content, and automatically updating metadata that is stored on the device and that is associated with the item of electronic content, based on the notification.

According to another aspect, the subject matter described in this disclosure may be embodied in methods that include the actions of receiving an indication that metadata associated with electronic content stored on a mobile device has been updated, and identifying one or more other devices associated with a user of the mobile device that also store the electronic content. The actions also include causing metadata associated with the electronic content stored on the one or more other devices to be automatically updated.

According to another aspect, the subject matter described in this disclosure may be embodied in a system that includes first and second devices, and a server. The first device includes a storage medium configured to store metadata associated with an item of electronic content, one or more processors configured to determine that metadata stored on the storage medium in association with the item of electronic content has been updated, and a network interface configured to automatically transmit a notification that the metadata stored on the storage medium in association with the item of electronic content has been updated. The second device includes a storage medium configured to store metadata associated with the item of electronic content, a network interface configured to receive a notification that the metadata stored on the storage medium in association with the item of electronic content is to be updated, and one or more processors configured to automatically update the metadata that is stored on the storage medium in association with the item of electronic content, based on receiving the notification that the metadata stored on the storage medium in association with the item of electronic content is to be updated. The server includes a network interface configured to receive, from the first device, the notification that the metadata stored on the storage medium in association with the item of electronic content has been updated, and transmit, to the second device, the notification that the metadata stored on the storage medium in association with the item of electronic content is to be updated. The server also includes one or more processors configured to select the second device.

Other implementations of these aspects include corresponding systems, apparatus, and computer programs, configured to perform the actions of the methods, encoded on computer storage devices.

These and other implementations may each optionally include one or more of the following features. For instance the first device and the second device are devices that are known by the one or more servers to be associated with the user at a time when the user has updated the metadata; the second device is a device that is known by the one or more servers to be associated with the user a time when the user has updated the metadata, and the first device is a device that is not known by the one or more servers to be associated with the user at the time when the user has updated the metadata; and/or the first device automatically communicates the notification to the one or more servers through an Application Programming Interface (API).

In additional aspects, the item of electronic content includes an audio or video recording, a game, an application, a ringtone, or wallpaper; determining that the metadata associated with the item of electronic content has been updated further includes determining that the user has played, skipped, or applied a tag or rating to the item of electronic content; selecting a second device that is associated with the user further includes determining, at a first point in time, that the second device does not store the item of electronic content, and determining, at a later, second point in time, that the second device has begun storing the item of electronic content; and/or automatically communicating a notification of the update between the first device and one or more servers further includes communicating the notification of the update between the first device and the one or more servers without requiring the user to physically connect the first device to the one or more servers or to the second device In further aspects, automatically communicating a notification of the update between the first device and one or more servers further includes communicating the notification of the update between the first device and the one or more servers without requiring the user to manually initiate the communication; selecting a second device that is associated with the user further includes selecting a second device that is associated with the user and that is also associated with the item of electronic content; automatically updating metadata that is stored on the second device and that is associated with the item of electronic content further includes generating metadata for storage in association with the item of electronic content; and/or when the metadata is generated, the item of electronic content is not yet stored by the second device.

The details of one or more implementations of the subject matter described in this disclosure are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
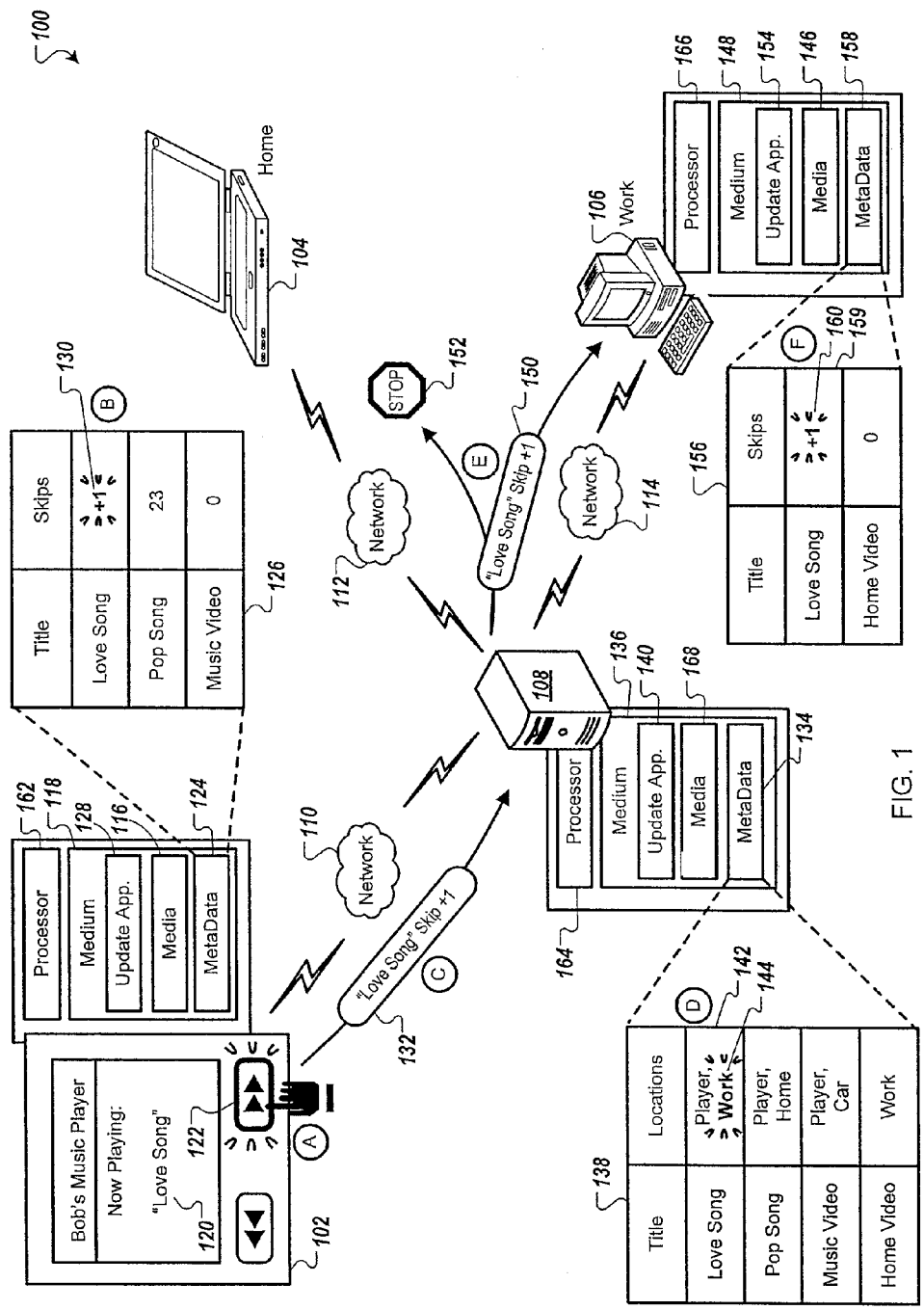
FIGS. 1 and 3 are diagrams of example systems that may be used for updating metadata associated with an item of electronic content.

FIG. 1 is a diagram of an example system 100 that may be used for updating metadata associated with an item of electronic content. The system 100 includes a media player device 102, a home client computing device 104, and a work client computing device 106, and a server 108, where each of the devices 102, 104, and 106 is associated with a user "Bob". The media player device 102 is configured to communicate with the server 108 over a network 110. The home client computing device 104 is configured to communicate with the server 108 over a network 112 and the work client computing device 106 is configured to communicate with the server 108 over a network 114.

The networks 110 to 114 may include private networks, such as corporate intranets, or public networks, such as the Internet. The networks 110 to 114 may include the same network or different networks. In other implementations, one or more of the devices of the system 100 are connected to each other through a physical connection instead of a network connection.

In general, the various devices in the system 100 may each store one or more items of electronic content, such as audio or video recordings, games, applications, ringtones, wallpaper, electronic books, etc. Each device may also store metadata associated with an item of electronic content, such as a user rating and one or more user-entered tags for an audio recording, or a last-page-read for an electronic book. In general, metadata may be generated or updated each time a user interacts with an item of electronic content.

In one example, the media player device 102 may be able to play various types of electronic content. For example, the user may use the media player 102 to hear audio content, view video content, read an electronic book, or consume some other type of electronic content. In response to the user interacting with an item of electronic content, one or more items of metadata may be generated or updated. For example, metadata may be generated indicating that the user played, skipped or turned the volume up for a song, that the user has downloaded or has finished watching a movie, or that the user read up to a particular page in an electronic book.

In response to determining that metadata associated with an item of electronic content has been updated on a device, a notification may be automatically communicated from a device to the server 108. The server 108 may select one or more other devices to be notified of the update, and may automatically communicate the notification to each of the selected devices. In response to receiving the notification, each of the selected devices may automatically update metadata that is associated with the item of electronic content based on the notification, resulting in the synchronization of metadata across devices associated with the user.

FIG. 1 also illustrates the updating of metadata associated with an item of electronic content, shown in states "A" to "F". States "A" to "F" may occur in the illustrated sequence, or they may occur in a sequence that is different than is illustrated.

During state "A", a user is listening to music on the media player device 102. The user may, for example, be listening to one or more songs included in media 116 stored in computer readable medium 118 included in the media player device 102. The user may, for example, be listening to music while exercising at a health club. As indicated by a message 120, a "Love Song" song has started to play on the media player device 102. Perhaps because the user does not want to hear the "Love Song" song while exercising (or, for some other reason), the user selects a control 122 to skip the "Love Song" song.

The media player device 102 may include metadata 124 that is included in the computer readable medium 118. The metadata 124 may include data that is stored, for example, in response to interactions related to items of electronic content. The metadata 124 may include, for example, among other metadata, metadata 126. The metadata 126 includes a set of song identifiers, and for each song identifier, a count of how many times the song has been skipped (e.g., how many times the song has been skipped in a particular time period (e.g., the current year), or how many total times the song has been skipped by the user). For example, the metadata 126 includes information indicating that an item of electronic content titled "Pop Song" song has been skipped "23" times and that an item of electronic content titled "Music Video" has never been skipped.

During state "B", in response to the user pressing the control 122 on the media player device 102 to skip the "Love Song" song, an update application 128 increments a skip count for the "Love Song" song in the metadata 126, as indicated by a "+1" indicator 130. If the "Love Song" song has been skipped for the first time, the update application 128 may generate an initial entry in the metadata 126 for the "Love Song" song and may set the associated skip count to "1". If there is an existing entry in the metadata 126 for the "Love Song" song, the update application 128 may increment the associated skip count by "1".

During state "C", in response to the updating of the metadata 126, a notification 132 of the update is automatically communicated from the media player device 102 to the server 108, over the network 110. The notification 132 may include, for example, an indication of the item of electronic content for which metadata was updated (e.g., "Love Song"), and an indication of the type of metadata update (e.g., an increment to a skip count). The notification 132 may also include information identifying the user and/or the media player device 102. The notification 132 is communicated between the media player device 102 and the server 108 without requiring the user to physically connect the media player device 102 to the server 108 and without requiring the user to manually initiate the communication.

The server 108 includes metadata 134 included in computer readable medium 136. The metadata 134 includes, among other metadata, metadata 138. The metadata 138 includes, in association with the user, a set of identifiers of items of electronic content, and for each identifier, a list of devices which store the respective item of electronic content. For example, the metadata 134 indicates that the "Love Song" song is stored on the media player device 102 and on the work client computing device 106, that an item of electronic content titled "Pop Song" is stored on the media player device 102 and on the home client computing device 104, that an item of electronic content titled "Music Video" is stored on the media player device 102 and on a device included in the user's car, and that an item of electronic content titled "Home Video" is stored on the work client computing device 106.

During state "D", an update application 140 included in the computer readable medium 136 may, in response to receiving the notification 132, identify an entry in the metadata 138 corresponding to the item of electronic content identified in the notification 132 (e.g., "Love Song"). For example, the update application 140 may identify an entry 142. The update application 140 may determine, based on the entry 142, whether one or more devices other than the device which sent the notification 132 also store the item of electronic content. For example, the update notification may identify, in the entry 142, a reference 144 to the work client computing device 106. The reference 144 may indicate that the an item of electronic content titled "Love Song" is stored in media 146 included in computer readable medium 148 of the work client computing device 106.

During state "E", the server 108 automatically communicates a notification to each device identified as storing the item of electronic content. For example, the server 108 communicates a notification 150 to the work client computing device 106 over the network 114. Similar to the notification 132, the notification 150 may include, for example, an indication of the item of electronic content for which metadata was updated (e.g., "Love Song"), and an indication of the type of metadata update (e.g., an increment to a skip count).

As illustrated by reference 152, the server 108 does not communicate a notification to the home client computing device 104, since the home client computing device 104 is not identified as storing the "Love Song" item of electronic content. Communicating a notification about an update to metadata for an item of electronic content only to devices which store the item of electronic content may result in communication of less data than if a notification is sent to each of the user's devices regardless of whether a device stores the item of electronic content. In some implementations, however, a notification is sent to each of the user's devices, regardless of whether a device stores the item of electronic content.

During state "F", an update application 154 updates metadata 156 included in metadata 158 included in the computer readable medium 148. Similar to the metadata 126, the metadata 156 includes a set of song identifiers, and for each song identifier, a count of how many times the song has been skipped. The update application 154 may identify an entry 159 in the metadata 156 corresponding to the item of electronic content identified in the notification 150, and may increment a skip count associated with the entry 159, as illustrated by a "+1" indicator 160. After the completion of state "F", the metadata update initiated in state "A" is reflected in each of the user's devices which store the item of electronic content.

To further describe the system 100, each of the networks 110, 112, and 114 may be a private network, such as an intranet, a public network, such as the Internet, or some combination thereof. Two or more of the networks 110, 112, and 114 may be the same network. The media player device 102, the home client computing device 104, and the work client computing device 106 may each be, for example, a laptop computer, desktop computer, television, set top box, mobile phone, PDA (Personal Digital Assistant), smart phone, BlackBerry™, portable music player, some other handheld or mobile device, or some other type of client device.

The media player device 102 includes a processor 162, the server 108 includes a processor 164, the work client computing device 106 includes a processor 166, and the home client computing device 104 includes a processor (not shown) and computer readable medium (not shown). The processors 162, 164, and 166 may each be a processor suitable for the execution of a computer program, such as a general or special purpose microprocessor. In some implementations, one or more of the client device 102, the server 108, the home client computing device 104, and the work client computing device 106 includes more than one processor. Each of the computer-readable mediums 118, 136, and 148 store and record information or data, and each may be an optical storage medium, magnetic storage medium, flash memory, or any other storage medium type.

In some implementations, the computer readable medium 136 included in the server 108 includes media 168. For example, the media 168 may include some or all of the media included in the media 116 and the media 146. In some implementations, the computer readable medium 168 includes a media index, such as the metadata 134, which indicates which items of electronic content are stored on which devices. In some implementations, the computer readable medium 168 includes both the media 168 and a media index.

Figure 2:
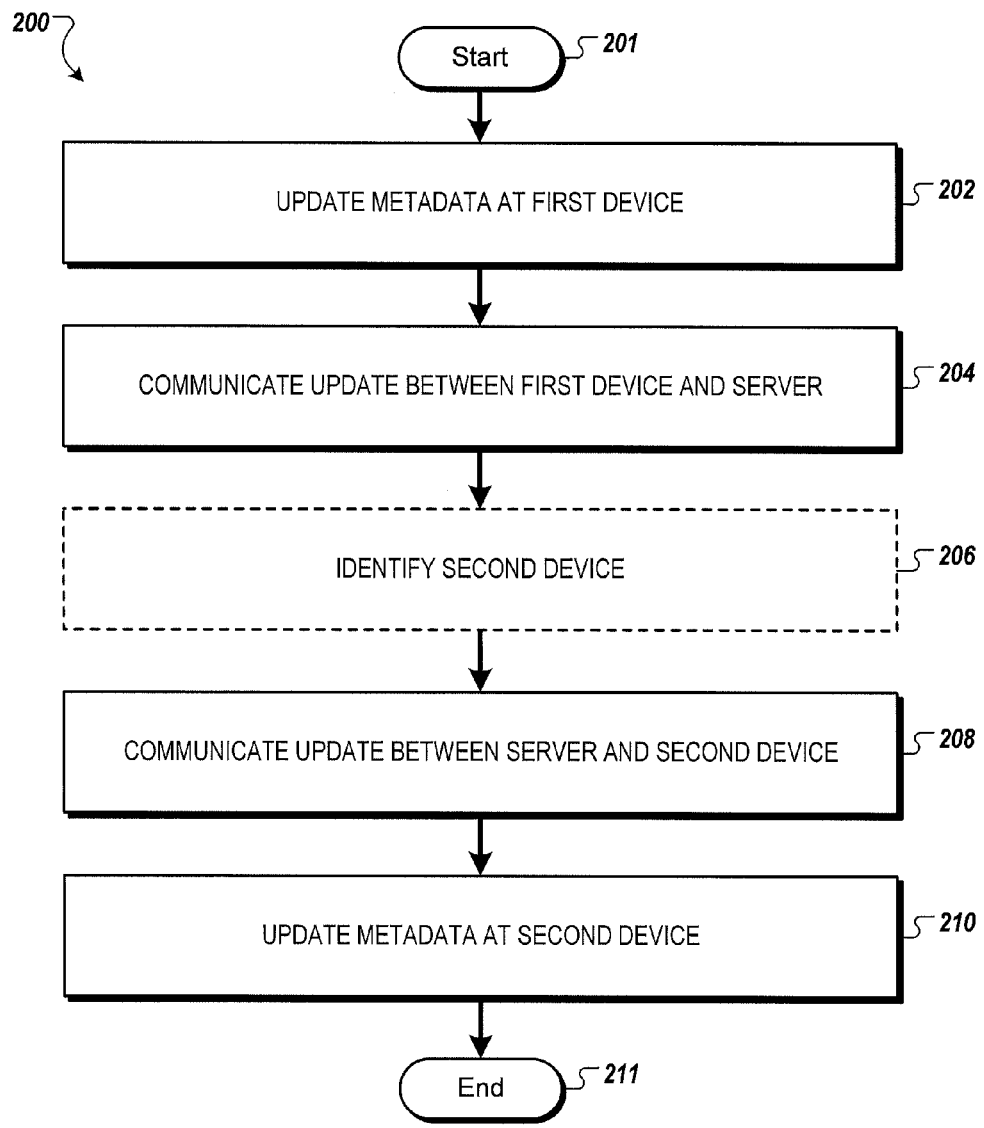
FIG. 2 is a flowchart of example process.

FIG. 2 is a flowchart of a example process 200. Briefly, the process 200 includes the actions of: determining that, on a first device, metadata associated with an item of electronic content has been updated; automatically communicating a notification of the update between the first device and one or more servers; selecting a second device that is associated with a user of the first device; automatically communicating the notification between the one or more servers and the selected second device; and automatically updating, by the second device, metadata that is stored on the second device and that is associated with the item of electronic content, based on the notification.

In more detail, when the process 200 begins (201), it is determined that metadata associated with an item of electronic content has been updated on a first device (202). The item of electronic content may be, for example, an audio or video recording, a game, an application, a ringtone, wallpaper, an electronic book, or some other type of electronic content. The updating of metadata may include the user playing, skipping, applying a tag or a rating, or performing some other interaction to the item of electronic content, to name a few examples. As another example, metadata may be updated in response to a user reading up to a particular page in an electronic book on the first device. In general, metadata may be updated in response to a user action or in response to a device-initiated action. For example, metadata may be updated in response to the first device automatically downloading an update to an application.

In response to the metadata update, a notification of the update is automatically communicated between the first device and one or more servers (204). The first device may, for example, automatically communicate the notification to the one or more servers through an Application Programming Interface (API). The API may allow the first device to communicate, along with other data, a type of metadata update and an indication of the associated item of electronic content.

The update may be communicated without requiring any action by the user. For example, the notification of the update may be communicated between the first device and the one or more servers without requiring the user to physically connect the first device to the one or more servers or to the second device. As another example, the notification may be communicated without requiring the user to manually initiate the communication.

The first device may be known by the one or more servers to be associated with the user at a time when the user has updated the metadata. For example, one or more of the servers may store metadata which indicates that the first device is associated with the user. The metadata associating the first device with the user may, for example, have been first stored on a server in response to the first device being registered with the server.

As described in more detail below with respect to FIG. 3, the first device may be a device that is not known by the one or more servers to be associated with the user at the time when the user has updated the metadata. For example, the first device may be a device that is owned by or associated with a third party. In this example, the API may allow the first device to send an identity of the user, along with a type of metadata update and an indication of the associated item of electronic content.

Optionally, a second device that is associated with a user of the first device is selected (206). The second device may be a device that is known by the one or more servers to be associated with the user a time when the user has updated the metadata. In some implementations, a third and possibly other devices are also selected, if two or more other devices other than the first device are known by the one or more servers to be associated with the user. In some implementations, all devices that are known by the one or more servers to be associated with the user are selected.

As another example, in some implementations, a second device (and possibly one or more other devices) that is associated with the user and that is also associated with the item of electronic content is selected. For example, in addition to the first device, there may be four other devices associated with the user, and that the item of electronic content is stored on two of the four devices. In this example, the two devices which store the item of electronic content may be selected. As another example, the second device may be a device that is capable of playing both audio and video content, and that the third device is capable of playing audio content but not video content. In this example, if the item of electronic content is a video recording, the second device but not the third device may be selected.

The notification is automatically communicated between the one or more servers and the selected second device (208). If more than one device is selected, the notification may be communicated to each selected device. The notification may be automatically communicated through an API. The notification may be communicated without requiring the second device to be physically connected to a server.

Metadata that is stored on the second device and that is associated with the item of electronic content is automatically updated, by the second device, based on the notification (210), thereby ending the process 200 (211). For some notifications, an existing item of metadata may be updated (e.g., an existing item of metadata may be replaced with a new item of metadata, based on information included in the notification). For example, if the notification indicates a skip of a song and if the second device previously stored a skip count of five for the song, the stored value of five may be replaced with an updated value of six. As another example, for some notifications, metadata may be generated for storage in association with the item of electronic content. For example, if the notification indicates a rating for a video recording and if the second device currently does not store a rating for the video recording, metadata indicating the received rating may be generated and stored on the second device, in association with the video recording.

For some notifications, when the metadata is generated or updated on the first device, the item of electronic content is not yet stored by the second device. For example, as described above, in some implementations, the notification may be automatically communicated to each device that is associated with the user, regardless of whether a device currently stores the item of electronic content. In these implementations, it may be determined, at a later point in time, after the metadata is stored on the second device, that the second device has begun storing the item of electronic content, and in response to the determination the stored metadata may be associated with the item of electronic content.

As a particular example, a user may rate a song using a first device, where the song is stored on the first device but is not stored on the user's second device. A notification for the rating may be sent to the second device and metadata for the rating may be stored on the second device. When the user later downloads the song to the second device. The metadata for the rating previously stored on the second device may be associated with the song, in metadata stored on the second device.

As mentioned above, in some implementations, a notification is not sent to a second device if a server determines that the second device does not store the item of electronic content. However, the server may, at a later point in time, determine that the second device has begun storing the item of electronic content (e.g., the user may download the item of electronic content to the second device). In response to determining that the item of electronic content is stored on the second device, the server may automatically communicate the notification to the second device.

Figure 3:
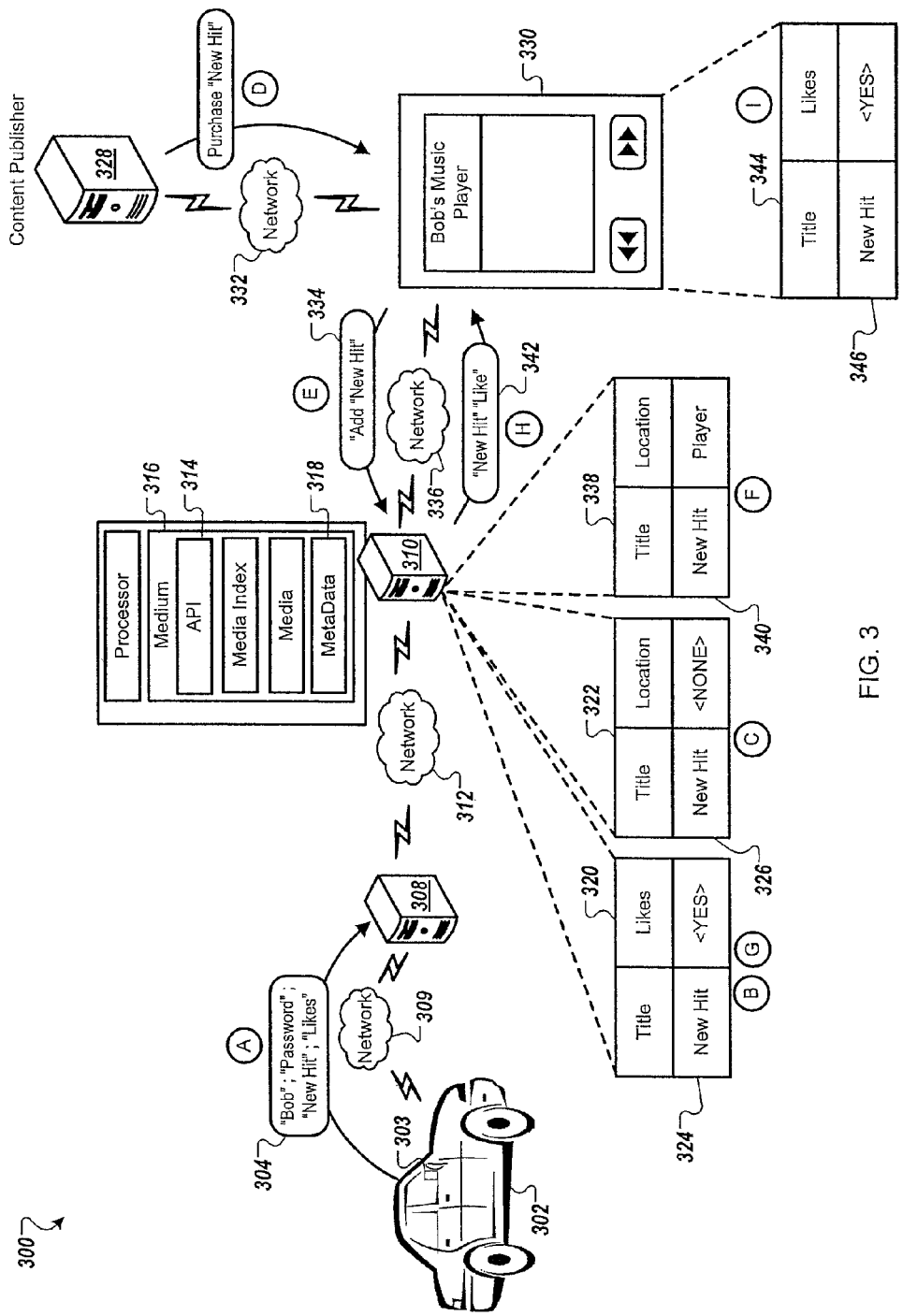

FIG. 3 is a diagram of an example system 300 that may be used for updating metadata associated with an item of electronic content. A user (e.g., "Bob") is in a rental car 302, listening to an item of electronic content titled "New Hit" on a media player device 303 included in the rental car 302. The media player device 303 may, for example, include an interface which allows the user to tag or to rate songs played on the media player device 303.

In an initial state "A", in response to the user tagging or rating the "New Hit" song, a notification 304 is communicated to a third party server 308 over a network 109. For example, the media player device 303 may be capable of communicating over a cellular or other network. The third party server 308 may forward the notification 304 to a content server 310, over a network 312. The notification 304 may be communicated between the third party server 308 and the content server 310 using an API 314 included in computer readable medium 316 of the content server 310. The media player device 303 is an example of a device which is not known to the server 308 at the time that metadata is updated.

The notification 304 includes an identifier of the user (e.g., "Bob"), a password (e.g., a password for the user, a password associated with the third party server 308, or a password associated with the content server 310), an indication of the type of metadata update (e.g., an indication that the user tagged the item of electronic content), and an indication of the associated item of electronic content (e.g., "New Hit"). The identifier of the user and a user-associated password may, for example, be entered by the user using an interface of the media player device 303.

The content server 310 includes metadata 318. The metadata 318 may include, among other metadata, metadata 320 and metadata 322. The metadata 320 includes, in association with the user, a set of identifiers of items of electronic content, and for each identifier, an indication of whether the user has tagged the item of electronic content. The metadata 322 includes, in association with the user, a set of identifiers of items of electronic content, and for each identifier, a set of zero or more indicators which indicate which devices of the user store the item of electronic content.

In a state "B", in response to receiving the notification 304, the content server 310 determines that the metadata 320 does not currently store an entry in the metadata 320 for the "New Hit" song. The content server 310 generates an entry 324, which includes an identifier for the "New Hit" song and an indication (e.g., "<YES>") that the user tagged the "New Hit" song.

In a state "C", the content server determines whether an entry for the "New Hit" song exists in the metadata 322, and, if an entry exists, which devices store the "New Hit" song. In this example, the content server identifies an entry 326 for the "New Hit" song. The entry 326, however, indicates (e.g., by an indicator "<NONE>") that no devices of the user currently store the "New Hit" song.

In a state "D", the user purchases the "New Hit" song from a content publisher 328. For example, the user may purchase the "New Hit" song using a media player device 330, over a network 332. The "New Hit" song may be downloaded to the media player device 330.

In a state "E", a notification 334 is automatically communicated from the media player device 330 to the content server 310, over a network 336. The notification 334 includes information identifying the "New Hit" song and information indicating that the new song was added to the media player device 330. The notification 334 may also include information identifying the user and/or the media player device 330.

In a state "F", in response to receiving the notification 334, the content server 310 updates the metadata 322 (e.g., as illustrated by an updated metadata 338) to record that the media player device 330 stores the "New Hit" song. For example, the content server may identify and update the entry 326 to an updated entry 340.

In a state "G", the content server 310 determines whether the metadata 318 includes other metadata associated with the newly added "New Hit" song. For example, the content server 310 may determine that the metadata 320 includes the entry 324 indicating that the user previously tagged the "New Hit" song.

In a state "H", the content server 310 may, in response to identifying the entry 324, automatically communicate a notification 342 to the media player device 330. The notification 342 includes an indication of the "New Hit" song and an indication of the type of metadata update (e.g., that the user tagged the "New Hit" song).

In a state "I", the media player device 330 updates metadata 344 included in the media player device 330. For example, an entry 346 may be generated and added to the metadata 344. The entry 346 indicates that the user tagged the "New Hit" song. Although the "New Hit" song was not stored on the media player device 330 when the user tagged the "New Hit" song using the media player device 303, and even though the media player device 303 was not known to the content server 310 at the time the user tagged the "New Hit" song, after state "I", metadata indicating that the user tagged the "New Hit" song is stored on the media player device 330.

Figure 4:
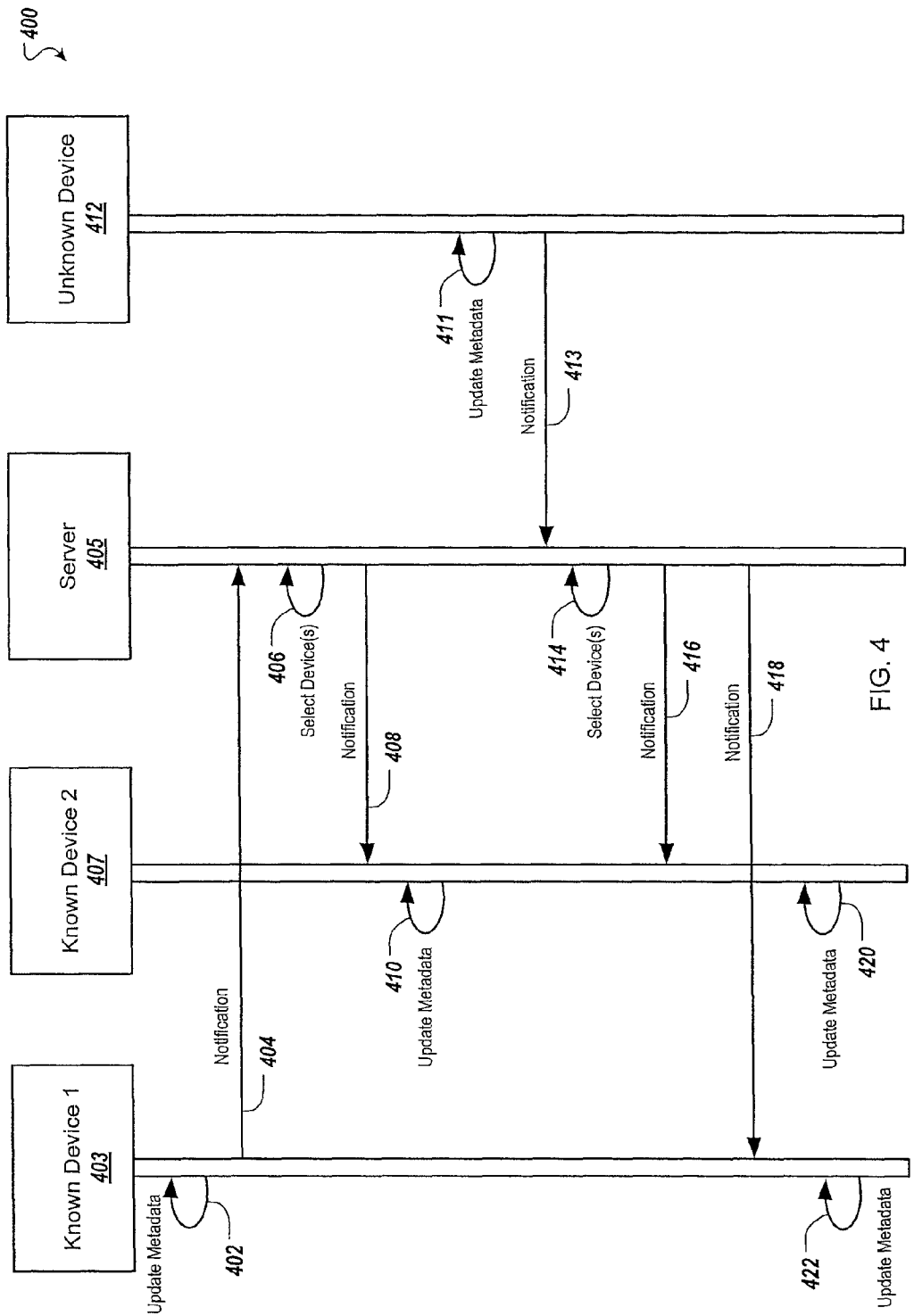
FIG. 4 is a swim lane diagram depicting an example process.

FIG. 4 is a swim lane diagram depicting an example process 400. As illustrated by an arrow 402, metadata associated with an item of electronic content is updated on a first known device 403. The first known device 403 sends a notification 404 to a server 405. The notification 404 may include, for example, some or all of an indication of the item of electronic content, an indication of the type of metadata update (e.g., a rating, tagging, playing, or skipping of the item of electronic content), identifying information of the first known device 403, and identifying information for the user of the first known device 403.

As illustrated by an arrow 406, the server 405 selects one or more target devices to receive the notification 404. The server 405 may select, as target devices, one or more devices other than the first known device 403 which are associated with the user and which store the item of electronic content. For example, the server 405 may select a second known device 407. The server 405 sends a notification 408 to each of the selected target devices, which, in this example, includes the second known device 407. The notification 408 may be, for example, a copy of the notification 404 or may include information similar to the information included in the notification 404. As illustrated by an arrow 410, the second known device 407 updates metadata associated with the item of electronic content, based on the notification 408.

As illustrated by an arrow 411, metadata is updated on an unknown device 412. The unknown device 412 may be, for example, a device that is not known to the server 405 at the time that the metadata is updated on the unknown device 412. For example, the user of the first known device 403 may be borrowing a friend's media player device.

In response to the updating of metadata on the unknown device 412, a notification 413 is sent from the unknown device 412 to the server 405. The notification 413 may include, for example, some or all of an indication of the item of electronic content, an indication of the type of metadata update, identifying information of the unknown device 412, and identifying information for the user of the unknown device 412. The notification 413 may also include, for example, a password associated with the user and/or a password associated with the server 405. The notification 413 may be sent, for example, using an API provided by the server 405.

As illustrated by an arrow 414, the server 405, in response to receiving the notification 413, selects one or more target devices. For example, the server 405 may select as target devices all devices known to be associated with the user, regardless of whether the item of electronic content referred to in the notification 413 is stored on a respective device. For example, the server 405 may select the first known device 403 and the second known device 407.

The server 405 sends a notification 416 to the second known device 407 and sends a notification 418 to the first known device 403. As illustrated by an arrow 420, the second known device 407 updates metadata on the second known device 407 based on the notification 416. Similarly, as illustrated by an arrow 422, the first known device 403 updates metadata on the first known device 403 based on the notification 418.

A number of implementations have been described. Nevertheless, it will be understood that various modifications may be made without departing from the spirit and scope of the disclosure. For example, various forms of the flows shown above may be used, with steps re-ordered, added, or removed.

Aspects and all of the functional operations described in this disclosure may be implemented in digital electronic circuitry, or in computer software, firmware, or hardware, including the structures disclosed in this disclosure and their structural equivalents, or in combinations of one or more of them. Aspects may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this disclosure may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, aspects may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Aspects may be implemented in a computing system that includes a back end component, e.g., as a data server, or that includes a middleware component, e.g., an application server, or that includes a front end component, e.g., a client computer having a graphical user interface or a Web browser through which a user may interact with an apsect, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular aspects. Certain features that are described in this disclosure in the context of separate implementations may also be implemented in combination in a single aspect. Conversely, various features that are described in the context of a single aspect may also be implemented in multiple aspects separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations of the invention have been described. Other implementations are within the scope of the following claims. For example, the actions recited in the claims may be performed in a different order and still achieve desirable results.

What is claimed is:

1. A computer-implemented method comprising:
   receiving, at one or more servers, a notification of an update of first metadata associated with an item of electronic content on a first device;
   locating a designated entry among one or more entries of second metadata using the one or more servers, wherein the designated entry refers to at least a second device that stores the item of electronic content, wherein the second metadata differs from the first metadata, and wherein the second device differs from the first device;
   identifying the second device based on the designated entry using the one or more servers;
   after identifying the second device, communicating the notification from the one or more servers to at least the second device; and
   automatically updating, by the second device, the metadata that is stored on the second device and that is associated with the item of electronic content, based on the notification.

2. The method of claim 1, wherein the second device is a device that is known by the one or more servers to be associated with a user of the first device at a time when the metadata has been updated.

3. The method of claim 1, wherein receiving the notification of the update comprises receiving the notification of the update through an Application Programming Interface (API).

4. The method of claim 1, wherein the item of electronic content comprises an audio or video recording, a game, an application, a ringtone, or wallpaper.

5. The method of claim 1, wherein the first metadata associated with the item of electronic content comprises metadata that the item of electronic content has been played, has been skipped, or has had a tag or rating applied.

6. The method of claim 1, wherein receiving the notification of the update comprises receiving the notification of the update without physically connecting to the one or more servers.

7. The method of claim 1, wherein receiving the notification of the update comprises receiving the notification of the update between the first device and the one or more servers without manually initiating a communication of the notification.

8. A system comprising:
   one or more computers and one or more storage devices storing instructions that are operable, when executed by the one or more computers, to cause the one or more computers to perform operations comprising:
   receiving a notification of an update of first metadata associated with an item of electronic content on a first device;
   locating a designated entry among one or more entries of second metadata, wherein the designated entry refers to at least a second device that stores the item of electronic content, wherein the second metadata differs from the first metadata, and wherein the second device differs from the first device;
   identifying the second device based on the designated entry;
   after identifying the second device, communicating the notification from the one or more servers to at least the second device; and
   automatically updating, by the second device, the metadata that is stored on the second device and that is associated with the item of electronic content, based on the notification.

9. The system of claim 8, wherein the second device is a device that is known by the one or more servers to be associated with a user of the first device at a time when the metadata has been updated.

10. The system of claim 8, wherein
   receiving the notification of the update comprises receiving the notification of the update through an Application Programming Interface (API).

11. The system of claim 8, wherein the item of electronic content comprises an audio or video recording, a game, an application, a ringtone, or wallpaper.

12. The system of claim 8, wherein the first metadata associated with the item of electronic content comprises metadata that the item of electronic content has been played, has been skipped, or has had a tag or rating applied.

13. The system of claim 8, wherein receiving the notification of the update comprises receiving the notification of the update without physically connecting to the one or more servers.

14. The system of claim 8, wherein receiving the notification of the update comprises receiving the notification of the update without manually initiating a communication.

15. A non-transitory computer-readable medium storing software comprising instructions executable by one or more computers which, upon such execution, cause the one or more computers to perform operations comprising:
   receiving a notification of an update of first metadata associated with an item of electronic content on a first device;
   locating a designated entry among one or more entries of second metadata, wherein the designated entry refers to at least a second device that stores the item of electronic content, wherein the second metadata differs from the first metadata, and wherein the second device differs from the first device;
   identifying the second device based on the designated entry;
   after identifying the second device, communicating the notification from between the one or more servers to at least the second device; and
   automatically updating, by the second device, the metadata that is stored on the second device and that is associated with the item of electronic content, based on the notification.

16. The medium of claim 15, wherein the second device is a device that is known by the one or more servers to be associated with a user of the first device at a time when the metadata has been updated.

17. The medium of claim 15, receiving the notification of the update comprises receiving the notification of the update through an Application Programming Interface (API).

18. The medium of claim 15, wherein receiving the notification of the update comprises receiving the notification of the update without manually initiating a communication.

\* \* \* \* \*